United States Patent

Arai

(10) Patent No.: US 8,837,091 B2
(45) Date of Patent: Sep. 16, 2014

(54) HEAD SUSPENSION HAVING ACTUATOR IN WHICH PIEZOLECTRIC ELEMENT IS BONDED WITH BONDING TAPE, ACTUATOR AND METHOD OF ATTACHING PIEZOELECTRIC ELEMENT WITH BONDING TAPE

(71) Applicant: NHK Spring Co., Ltd., Yokohama (JP)

(72) Inventor: Mikio Arai, Kanagawa (JP)

(73) Assignee: NHK Spring Co., Ltd., Kanagawa (JP)

( * ) Notice: Subject to any disclaimer, the term of this patent is extended or adjusted under 35 U.S.C. 154(b) by 0 days.

(21) Appl. No.: 14/047,658

(22) Filed: Oct. 7, 2013

(65) Prior Publication Data

US 2014/0104728 A1   Apr. 17, 2014

(30) Foreign Application Priority Data

Oct. 16, 2012   (JP) .................. 2012-228624

(51) Int. Cl.
  *G11B 5/56*   (2006.01)
  *G11B 5/48*   (2006.01)

(52) U.S. Cl.
  CPC ................. *G11B 5/4873* (2013.01)
  USPC ..................................... 360/294.4

(58) Field of Classification Search
  CPC ... G11B 5/4823; G11B 5/4873; G11B 5/5552
  USPC ................. 360/244.5, 244.7, 294.4
  See application file for complete search history.

(56) References Cited

U.S. PATENT DOCUMENTS

| | | | | |
|---|---|---|---|---|
| 8,351,160 | B2 * | 1/2013 | Fujimoto | 360/245.8 |
| 8,369,047 | B2 * | 2/2013 | Fujimoto et al. | 360/294.4 |
| 8,405,934 | B2 * | 3/2013 | Fuchino | 360/294.4 |
| 8,498,082 | B1 * | 7/2013 | Padeski et al. | 360/294.4 |
| 8,580,334 | B2 * | 11/2013 | Kashima | 427/100 |
| 8,630,067 | B2 * | 1/2014 | Ando et al. | 360/294.4 |
| 2001/0043443 | A1 | 11/2001 | Okamoto et al. | |
| 2002/0075606 | A1 | 6/2002 | Nishida et al. | |
| 2010/0073825 | A1 | 3/2010 | Okawara | |

FOREIGN PATENT DOCUMENTS

| | | |
|---|---|---|
| JP | 2002-050140 | 2/2002 |
| JP | 2002-184140 | 6/2002 |
| JP | 2010-079944 | 4/2010 |

* cited by examiner

*Primary Examiner* — Angel Castro (74) *Attorney, Agent, or Firm* — Jordan and Hamburg LLP (57) ABSTRACT

A head suspension includes a base to be attached to a carriage, a load beam having a rigid part and a resilient part that connects the rigid part to the base, the load beam applying load onto a read/write head, a flexure attached to the load beam and supporting the head, an actuator attaching part located between the base and the head, and a piezoelectric element being deformable in response to a voltage applied thereto to move the head in a sway direction relative to the base. For the head suspension, it bonds the piezoelectric element with a bonding tape to the actuator attaching part and applies an adhesive to fix the piezoelectric element to the actuator attaching part.

10 Claims, 9 Drawing Sheets

HEAD SUSPENSION HAVING ACTUATOR IN WHICH PIEZOLECTRIC ELEMENT IS BONDED WITH BONDING TAPE, ACTUATOR AND METHOD OF ATTACHING PIEZOELECTRIC ELEMENT WITH BONDING TAPE

BACKGROUND OF THE INVENTION

1. Field of the Invention

The present invention relates to a head suspension having a piezoelectric element that deforms in response to an applied voltage, an actuator having such a piezoelectric element, and a method of attaching such a piezoelectric element to an actuator attaching part.

2. Description of Related Art

A head suspension is a device installed in, for example, a hard disk drive to write and read data on a hard disk of the hard disk drive. Such a head suspension may have an actuator in which a piezoelectric element is attached to an actuator attaching part.

A head suspension, an actuator, and a method of attaching a piezoelectric element to an actuator attaching part according to a related art will be explained with reference to FIGS. 15A to 15F.

Figure 15A:
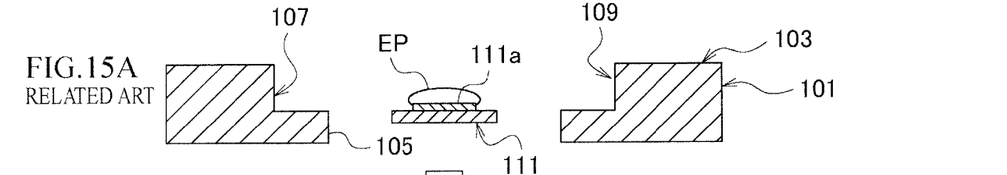
FIG. 15A illustrates an actuator attaching part and a contact of a flexure.
Figure 15B:
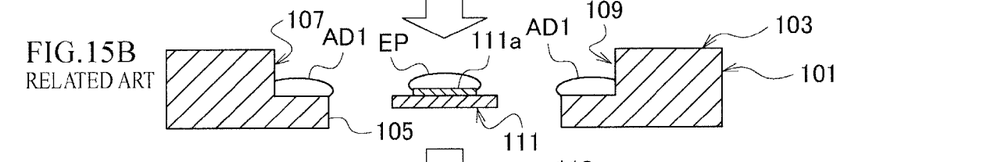
FIG. 15B illustrates a condition that a first adhesive is applied to the actuator attaching part.
Figure 15C:
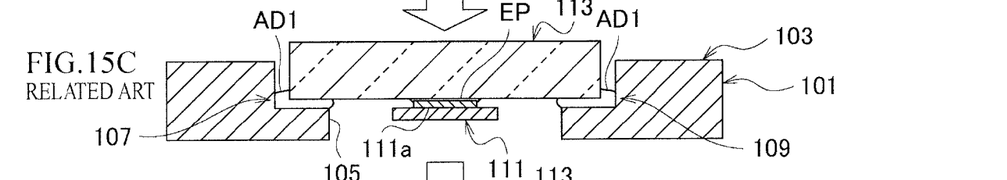
FIG. 15C illustrates a condition that a piezoelectric element is bonded to the actuator attaching part.
Figure 15D:
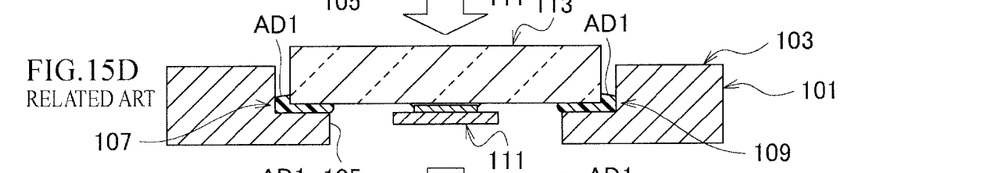
FIG. 15D illustrates a condition that the first adhesive is solidified.
Figure 15E:
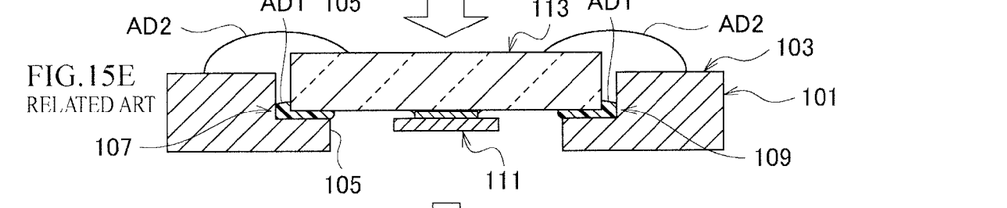
FIG. 15E illustrates a condition that a second adhesive is filled between the piezoelectric element and the actuator attaching part.
Figure 15F:
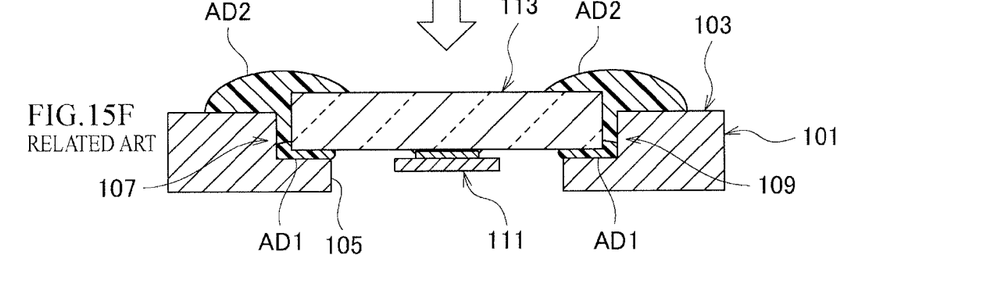
FIG. 15F illustrates a condition that the piezoelectric element is fixed to the actuator attaching part with the adhesives.

FIGS. 15A to 15F are sectional views, in which FIG. 15A illustrates an actuator attaching part 103 and a contact 111a of a flexure 111, FIG. 15B illustrates a condition that a first adhesive AD1 is applied to the actuator attaching part 103, FIG. 15C illustrates a condition that a piezoelectric element 113 is bonded to the actuator attaching part 103, FIG. 15D illustrates a condition that the first adhesive AD1 is solidified; FIG. 15E illustrates a condition that a second adhesive AD2 is filled between the piezoelectric element 113 and the actuator attaching part 103; and FIG. 15F illustrates a condition that the piezoelectric element 103 is fixed to the actuator attaching part 103 with the adhesives AD1 and AD2.

The piezoelectric element 113 is attached to the head suspension as illustrated in FIGS. 15A to 15F.

In FIG. 15A, the actuator plate 101 of the head suspension or the actuator has the actuator attaching part 103. The actuator attaching part 103 has an opening 105 and actuator supports 107 and 109 each having a recessed shape. In the opening 105, there is positioned the contact 111a of the flexure 111. Onto the contact 111a, conductive paste EP is applied.

In FIG. 15B, the first adhesive AD1 is applied to the actuator supports 107 and 109.

In FIG. 15C, the piezoelectric element 113 is set on the first adhesive AD1 so that the piezoelectric element 113 is bonded to the actuator supports 107 and 109 through the first adhesive AD1. At this time, an electrode surface of the piezoelectric element 113 is electrically connected through the conductive paste EP to the contact 111a of the flexure 111.

In FIG. 15D, the first adhesive AD1 solidifies.

In FIG. 15E, the second adhesive AD2 is filled between the actuator supports 107 and 109 and the piezoelectric element 113.

In FIG. 15F, the second adhesive AD2 solidifies and unites with the first adhesive AD1, thereby fixing the piezoelectric element 113 to the actuator attaching part 103.

The related art uses the first adhesive AD1 to correctly position the piezoelectric element 113 in the actuator attaching part 103 and the first and second adhesives AD1 and AD2 to surely fix the piezoelectric element 113 to the actuator attaching part 103.

In this way, the related art involves a plurality of steps to apply and harden the adhesives. Namely, the related art must apply the first adhesive AD1, harden the first adhesive AD1 after placing the piezoelectric element 113 thereon, fill the second adhesive AD2 between the actuator supports 107 and 109 and the piezoelectric element 113, and harden the second adhesive AD2. These adhesive applying and hardening steps are time-consuming to deteriorate productivity.

Further, the adhesives freely flow in the actuator attaching part 103 and frequently ooze due to the capillary action into unintended gaps between the piezoelectric element 113 and any one or more of actuator plate 101, flexure 111, and other parts of the head suspension. If this happens, the rigidity, spring load, and dynamic characteristics of the head suspension will be spoiled or varied.

This and other related arts are Japanese Unexamined Patent Application Publications No. 2002-050140, No. 2002-184140, and No. 2010-79944.

SUMMARY OF THE INVENTION

An object of the present invention is to provide a head suspension, an actuator, and a method of attaching a piezoelectric element to an actuator attaching part, capable of reducing the number of adhesive applying and hardening steps, correctly positioning the piezoelectric element, and preventing an adhesive from freely flowing.

In order to accomplish the object, a first aspect of the present invention provides a head suspension including a base to be attached to a carriage and turned around a spindle of the carriage, a load beam having a rigid part and a resilient part, the resilient part connecting the rigid part to the base, the load beam applying load onto a head at a front end distal to the base to write and read information, a flexure attached to the load beam, supporting the head, and including read/write wiring connected to the head, an actuator attaching part located between the base and the head, to enable the head to be moved in a sway direction relative to the base, a piezoelectric element fixed to the actuator attaching part and being deformable in response to a voltage applied thereto to move the head in the sway direction relative to the base, a bonding tape bonding the piezoelectric element to the actuator attaching part, an adhesive fixing the bonded piezoelectric element to the actuator attaching part.

A second aspect of the present invention provides a method of attaching a piezoelectric element to a head suspension that includes a base to be attached to a carriage and turned around a spindle of the carriage, a load beam having a rigid part and a resilient part, the resilient part connecting the rigid part to the base, the load beam applying load onto a head at a front end distal to the base to write and read information, a flexure attached to the load beam, supporting the head, and including read/write wiring connected to the head, an actuator attaching part located between the base and the head, to enable the head to be moved in a sway direction relative to the base, and a piezoelectric element fixed to the actuator attaching part and being deformable in response to a voltage applied thereto to move the head in the sway direction relative to the base. The method includes bonding the piezoelectric element with a bonding tape to the actuator attaching part and then applying an adhesive to fix the piezoelectric element to the actuator attaching part.

A third aspect of the present invention provides an actuator including an actuator attaching part located between a base and a movable part and movably supporting the movable part relative to the base, a piezoelectric element fixed to the actuator attaching part and being deformable in response to a voltage applied thereto to move the movable part relative to the base, a bonding tape bonding the piezoelectric element to the actuator attaching part, and an adhesive fixing the bonded piezoelectric element to the actuator attaching part.

A fourth aspect of the present invention provides a method of attaching a piezoelectric element to an actuator that has an actuator attaching part located between a base and a movable part and movably supporting the movable part relative to the base, and a piezoelectric element fixed to the actuator attaching part and being deformable in response to a voltage applied thereto to move the movable part relative to the base. The method includes bonding the piezoelectric element with a bonding tape to the actuator attaching part and then applying an adhesive to fix the piezoelectric element to the actuator attaching part.

According to the first aspect, the bonding tape bonds the piezoelectric element to the actuator attaching part and the adhesive fixes the bonded piezoelectric element to the actuator attaching part, to reduce the number of adhesive applying and hardening steps to one and surely position the piezoelectric element in the actuator attaching part by the bonding. In addition, the first aspect prevents the adhesive from penetrating into unintended gaps. Surely fixing the piezoelectric element to the actuator attaching part results in stabilizing the rigidity, spring load, and dynamic characteristics of the head suspension to precisely support the head.

According to the second aspect, the method uses the bonding tape to bond the piezoelectric element to the actuator attaching part of the head suspension and then applies the adhesive to fix the bonded piezoelectric element to the actuator attaching part. The method reduces the number of adhesive applying and hardening steps to one and surely positions the piezoelectric element in the actuator attaching part by the bonding, thereby improving productivity. The bonding tape restricts the flowing of the adhesive that is applied after bonding with the bonding tape, thereby preventing the adhesive from penetrating into unintended gaps. This results in stabilizing the rigidity, spring load, and dynamic characteristics of the head suspension. The bonding tape is easy to be handled for bonding the piezoelectric element to the actuator attaching part and using the bonding tape is achievable to improve productivity.

According to the third aspect, the bonding tape bonds the piezoelectric element to the actuator attaching part and the adhesive fixes the bonded piezoelectric element to the actuator attaching part, to reduce the number of adhesive applying and hardening steps to one and surely position the piezoelectric element in the actuator attaching part by the bonding. In addition, the third aspect prevents the adhesive from penetrating into unintended gaps. With the correctly fixed piezoelectric element, the actuator is capable of precisely driving, for example, a head of a head suspension.

According to the fourth aspect, the method uses the bonding tape to bond the piezoelectric element to the actuator attaching part of the actuator and then applies the adhesive to fix the bonded piezoelectric element to the actuator attaching part. The method reduces the number of adhesive applying and hardening steps to one and surely positions the piezoelectric element in the actuator attaching part by the bonding, thereby improving productivity. The bonding tape restricts the flowing of the adhesive that is applied after bonding with the bonding tape, thereby stabilizing the rigidity and other characteristics of the actuator. The bonding tape is easy to be handled for bonding the piezoelectric element to the actuator attaching part and using the bonding tape is achievable to improve productivity.

BRIEF DESCRIPTION OF THE DRAWINGS

FIG. 2 is a bottom plan view schematically illustrating the head suspension of FIG. 1 with see-through portions of a flexure and the like;

FIGS. 5A and 5B schematically illustrate the piezoelectric element that is provided with a bonding tape, in which

FIGS. 6A to 6D are sectional views illustrating a method of attaching the piezoelectric element to the actuator attaching part, according to the first embodiment of the present invention, in which

FIGS. 7A to 7D illustrate a process of individually attaching a piezoelectric element to an actuator attaching part according to the first embodiment, in which

FIGS. 8 and 9 illustrate a process of collectively attaching piezoelectric elements to actuator attaching parts according to the first embodiment, in which

FIGS. 10A to 10C illustrate a second embodiment of the present invention, in which

FIGS. 11A to 11C illustrate a modification of the second embodiment, in which

FIGS. 12A to 12C illustrate a third embodiment of the present invention, in which

FIGS. 13A and 13B are sectional views illustrating a fourth embodiment of the present invention, in which

FIGS. 14A to 14D are sectional views illustrating a fifth embodiment of the present invention, in which FIGS. 15A to 15F are sectional views illustrating a related art, in which

DETAILED DESCRIPTION OF EMBODIMENTS

The present invention reduces the number of adhesive applying and hardening steps to one, surely positions a piezoelectric element in an actuator attaching part of a head suspension or an actuator, and prevents an adhesive from freely flowing. For this, the present invention provides a head suspension (1) including a base (10) to be attached to a carriage and turned around a spindle of the carriage, a load beam (5) having a rigid part (21) and a resilient part (23a, 23b), the resilient part connecting the rigid part (21) to the base (10), the load beam (5) applying load onto a head (26) at a front end distal to the base (10) to write and read information, a flexure (7) attached to the load beam (5) and supporting the head (26), and including read/write wiring (28) connected to the head (26), an actuator attaching part (17) arranged between the base (10) and the head (26), to enable the head (26) to be moved in a sway direction relative to the base (10), and a piezoelectric element (15) fixed to the actuator attaching part (17), the piezoelectric element (15) being deformable in response to a voltage applied thereto to move the head (26) in the sway direction relative to the base (10). Based on the head suspension (1), the present invention bonds the piezoelectric element (15) with a bonding tape (27) to the actuator attaching part (17) and then applies a nonconductive adhesive (29) to fix the piezoelectric element (15) to the actuator attaching part (17).

Now, the present invention will be explained in detail with reference to the embodiments and accompanying drawings.

Figure 1:
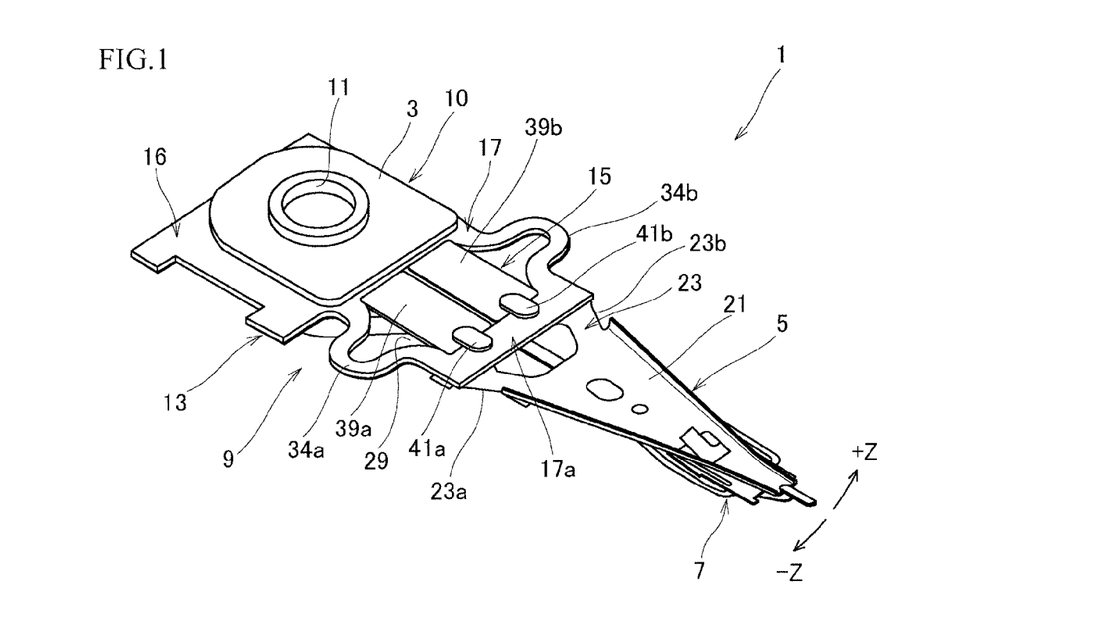
FIG. 1 is a perspective view illustrating a head suspension including an actuator, according to a first embodiment of the present invention.
Figure 2:
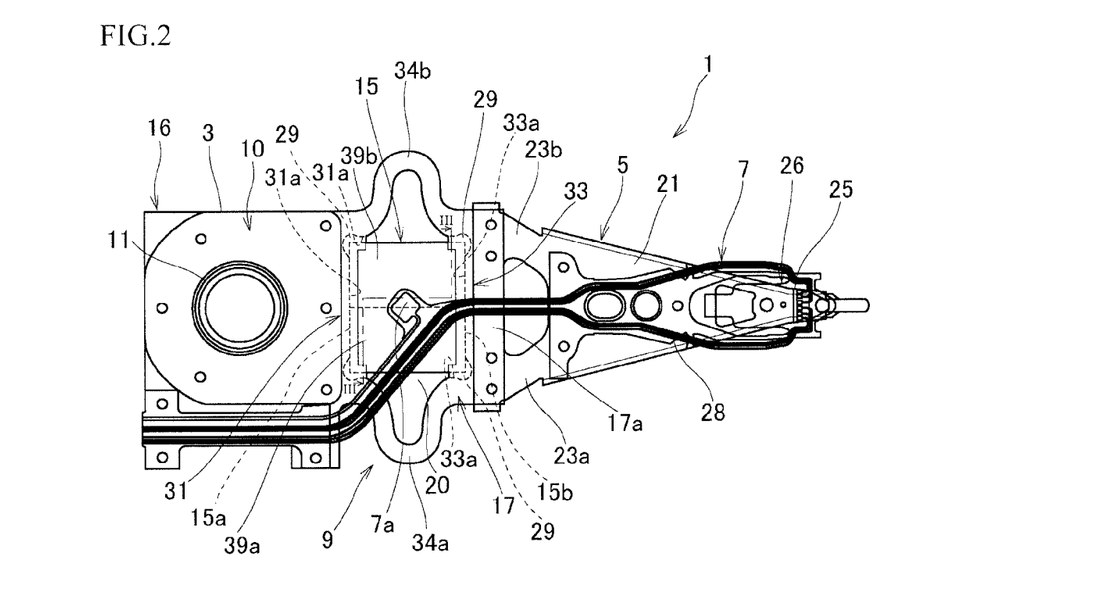

First, a head suspension, an actuator, and a method of attaching a piezoelectric element according to a first embodiment of the present invention will be explained. FIG. 1 is a perspective view illustrating the head suspension 1 according to the first embodiment and FIG. 2 is a bottom plan view schematically illustrating the head suspension 1 of FIG. 1 with see-through portions of the flexure 7 and the like. In this specification, a direction in a rotation radius of the head suspension is referred to as "length direction" or "front-rear direction", a direction orthogonal to the length direction as "width direction" or "sway direction", and an axial direction around which the head suspension is turned as "thickness direction".

As illustrated in FIGS. 1 and 2, the head suspension 1 has a base plate 3, a load beam 5, and a flexure 7. Also, the head suspension 1 includes the actuator 9.

The base plate 3 is a component of a base 10 that is fitted to a carriage (not illustrated) that drives and turns the base 10, i.e., the head suspension 1 around a spindle. The base plate 3 has a boss 11 allows the base plate 3 to be fixed to the carriage by ball-caulking. The base plate 3 is integrally attached to the actuator 9.

The actuator 9 includes an actuator plate 13 and a piezoelectric element 15 attached to the actuator plate 13. The actuator plate 13 includes a reinforcing part 16 and an actuator attaching part 17. The reinforcing part 16 is laid on the base plate 3 and is fixed thereto by, for example, laser spot welding, thereby forming the base 10. The actuator attaching part 17 has a front end 17a to which the load beam 5 is integrally fixed by, for example, laser spot welding.

The load beam 5 includes a rigid part 21 and a resilient part 23 comprising separated resilient parts 23a and 23b that connect a base end of the rigid part 21 to the base 10. The load beam 5 applies load onto a head 26 that is a movable part at a front end distal to the base 10 to write and read information. The resilient parts 23a and 23b are joined to the front end 17a of the actuator attaching part 17 of the actuator plate 13. To the rigid part 21 of the load beam 5, the flexure 7 is attached.

A front end of the flexure 7 has a slider 25 including read/write elements (not illustrated) to form the head 26. The read/write elements are connected to read/write wiring 28 of the flexure 7. The flexure 7 extends through the actuator attaching part 17 toward the base plate 3.

The actuator attaching part 17 is located between the base 10 and the head 26, to move the head 26 with the load beam 5 in the sway direction with respect to the base 10.

Figure 3:
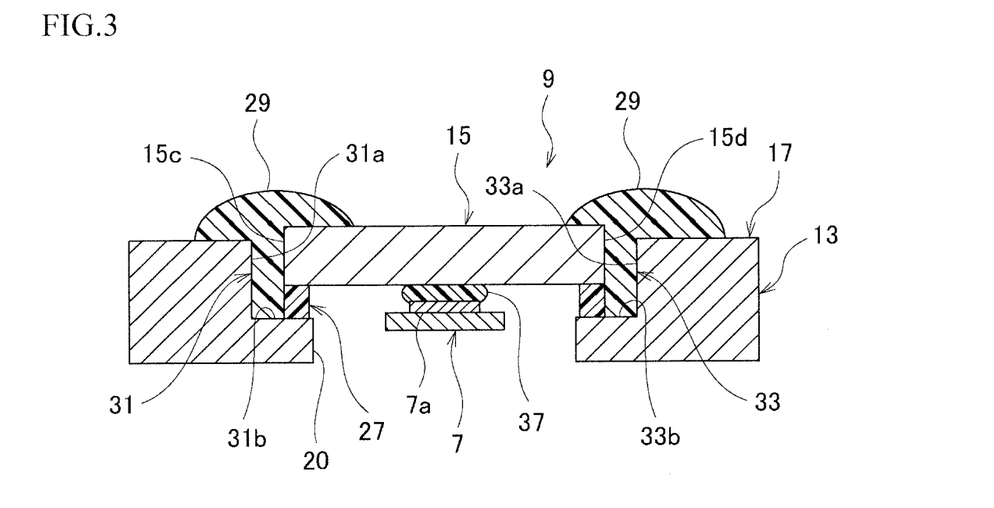
FIG. 3 is a sectional view taken along a line III-III of FIG. 2.
Figure 4:
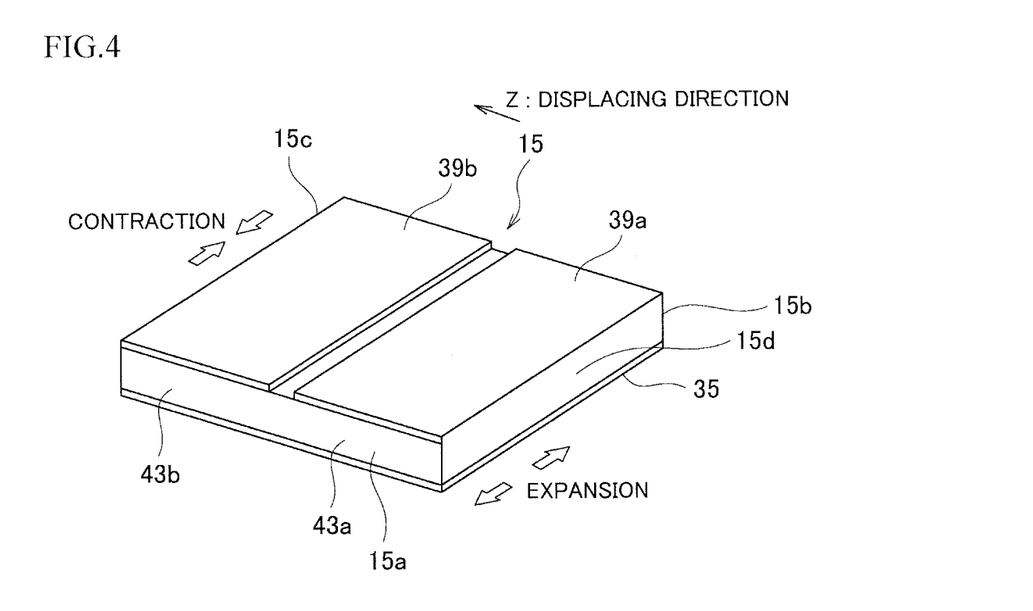
FIG. 4 is a perspective view illustrating the piezoelectric element of FIG. 3.

FIG. 3 is a sectional view taken along a line III-III of FIG. 2 and FIG. 4 is a perspective view illustrating the piezoelectric element 15.

As illustrated in FIGS. 3 and 4, the piezoelectric element 15 is fixed to the actuator attaching part 17 and deforms in response to a voltage applied thereto, to move the head 26 in the sway direction relative to the base 10. The piezoelectric element 15 is bonded to the actuator attaching part 17 with a bonding tape 27 and is fixed to the same with a nonconductive adhesive 29. This will be explained in more detail.

As illustrated in FIGS. 1 to 3, the actuator attaching part 17 has a through opening 20 formed through the actuator attaching part 17 at a central portion in the front-rear direction and actuator supports 31 and 33 formed on both sides of the through opening 20 in the front-rear direction, respectively. On respective widthwise sides of the actuator attaching part 17, left and right flexible parts 34a and 34b each having a U-shape are integrally formed and protrude outward. The actuator supports 31 and 33 continuously extends in the width direction from a base part of the flexible part 34a to a base part of the flexible part 34b along respective front and rear sides of the actuator attaching part 17. The actuator supports 31 and 33 include opposing faces 31a and 33a as upright faces extending along the thickness direction in the cross section of FIG. 3 and support faces 31b and 33b intersecting the thickness direction. The support faces 31b and 33b are orthogonal to the opposing faces 31a and 33a, so that each of the actuator supports 31 and 33 has a recessed shape.

The actuator supports 31 and 33 may be formed only at the bases of the flexible parts 34a and 34b, or only along the front and rear sides of the actuator attaching part 17, or only at four corners defined by the bases of the flexible parts 34a and 34b and the front and rear sides of the actuator attaching part 17. The opposing faces 31a and 33a and support faces 31b and 33b may be formed by joining separate plate materials together.

Front and rear edges of a common electrode plate 35 of the piezoelectric element 15 are bonded to the respective support faces 33b and 31b with the bonding tape 27. Front and rear end faces 15a and 15b of the piezoelectric element are fixed to the opposing faces 31a and 33a, respectively, with the nonconductive adhesive 29. End faces 15c and 15d of the piezoelectric element 15 are partly fixed to the opposing faces 31a and 33a in the width direction in the vicinities of the flexible parts 34a and 34b with the nonconductive adhesive 29.

According to the first embodiment, the bonding tape 27 is non-liquid and does not harden after the nonconductive adhesive 29 hardens. The bonding tape 27 may be one that hardens when the nonconductive adhesive 29 hardens.

The contact 7a of the flexure 7 (hereinafter also referred to as "flexure contact 7a") is bonded to a central part of the common electrode plate 35 of a first surface of the piezoelectric element 15 with conductive paste 37 such as silver paste that is a conductive adhesive. On a second surface opposite to the common electrode plate 35, the piezoelectric element 15 has a pair of electrode plates 39a and 39b that are connected to the front end 17a of the actuator attaching part 17 with respective conductive adhesives 41a and 41b as illustrated in FIG. 1.

As illustrated in FIG. 4, the piezoelectric element 15 is a flat plate having a rectangular shape and is made of a pair of piezoelectric materials 43a and 43b. On and over first surfaces of the piezoelectric materials 43a and 43b, the common electrode plate 35 is provided, and on second surfaces thereof, the pair of respective electrode plates 39a and 39b are provided.

When a voltage is applied to, for example, the common electrode plate 35, the piezoelectric material 43a contracts and the piezoelectric material 43b expands, so that the piezoelectric element 15 displaces in a Z-direction by a very small distance. This results in moving the head 26 in the Z-direction relative to the base 10.

When the common electrode plate 35 is grounded and a voltage is applied to the pair of electrode plates 39a and 39b, the piezoelectric element 15 displaces in a −Z-direction (opposite to the Z-direction) by a very small distance, to move the head 26 in the −Z-direction relative to the base 10.

The head suspension 1 is attached to a carriage (not illustrated) through the boss 11 and is installed in a hard disk drive. The carriage is driven by a voice coil motor in the hard disk drive, to turn the head suspension 1 so that the head 26 is moved on a hard disk of the hard disk drive to write and read information on the hard disk.

A method of attaching the piezoelectric element 15 to the actuator attaching part 17 of the head suspension 1 (the actuator 9) according to the first embodiment will be explained.

Figure 5A:
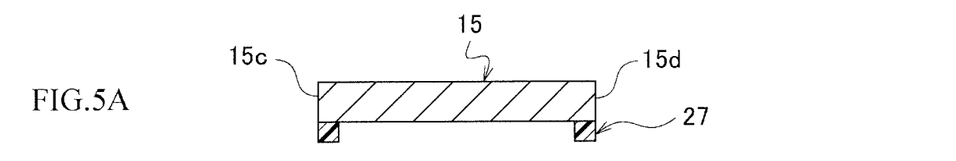
FIG. 5A is a sectional view taken along a line VA-VA of FIG. 5B
Figure 5B:
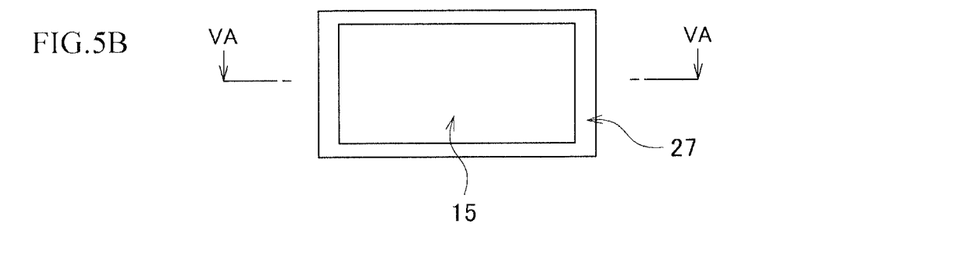
FIG. 5B is a back view of the piezoelectric element seen from the bonding tape side.
Figure 6A:
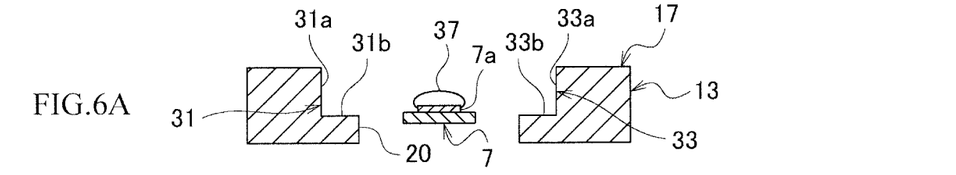
FIG. 6A illustrates the actuator attaching part and a contact of the flexure of the head suspension.
Figure 6B:
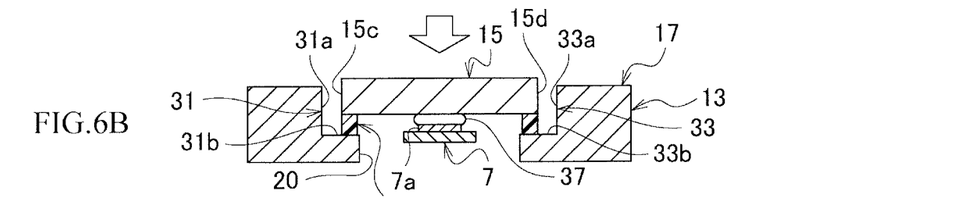
FIG. 6B illustrates a condition that the piezoelectric element is bonded to the actuator attaching part with the bonding tape.
Figure 6C:
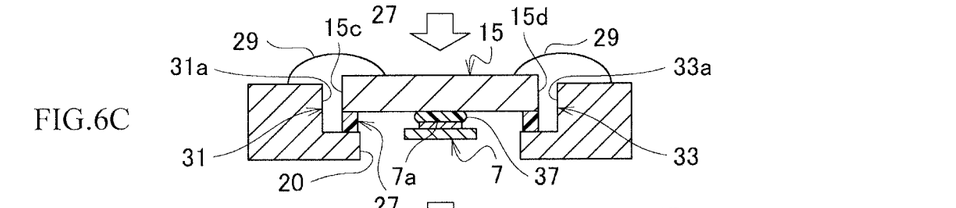
FIG. 6C illustrates a condition that an adhesive is filled between the piezoelectric element and the actuator attaching part.
Figure 6D:
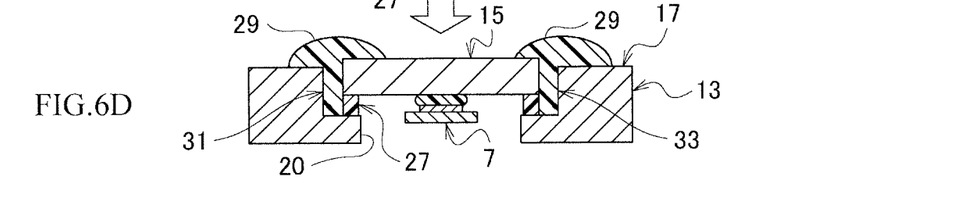
FIG. 6D illustrates a condition that the piezoelectric element is fixed to the actuator attaching part with the adhesive.

FIGS. 5A and 5B illustrate the piezoelectric element 15 with the bonding tape 27, in which FIG. 5A is a sectional view taken along a line VA-VA of FIG. 5B and FIG. 5B is a back view of the piezoelectric element 15 seen from the bonding tape side. FIGS. 6A to 6D are sectional views illustrating the piezoelectric element attaching method according to the first embodiment, in which FIG. 6A illustrates the actuator attaching part 17 and the contact 7a of the flexure 7, FIG. 6B illustrates a condition that the piezoelectric element 15 is bonded to the actuator attaching part 17 with the bonding tape 27, FIG. 6C illustrates a condition that the adhesive 29 is filled between the piezoelectric element 15 and the actuator attaching part 17, and FIG. 6D illustrates a condition that the piezoelectric element 15 is fixed to the actuator attaching part 17 with the adhesive 29.

In FIGS. 5A and 5B, the bonding tape 27 having a rectangular frame shape is bonded in advance along a peripheral edge of the common electrode plate 35 of the piezoelectric element 15 that is the rectangular flat plate.

In FIG. 6A, the contact 7a of the flexure 7 on which the conductive paste 37 is applied is set in the through opening 20 of the actuator attaching part 17 so that the contact 7a of the flexure 7 faces a space for accommodating the piezoelectric element 15 in the actuator attaching part 17.

In FIG. 6B, the piezoelectric element 15 with the bonding tape 27 bonded to the common electrode plate 35 is arranged in the actuator attaching part 17. The widthwise side edges of the piezoelectric element 15 are partly bonded to the support faces 31b and 33b with the bonding tape 27 around the flexible parts 34a and 34b. The front and rear edges of the piezoelectric element 15 are entirely bonded to the front and rear support faces 31b and 33b with the bonding tape 27. At this time, the contact 7a of the flexure 7 is bonded to a central portion of the common electrode plate 35 with the conductive paste 37.

The bonding tape 27 may be attached in advance to the support faces 31b and 33b, and thereafter, the piezoelectric element 15 may be bonded to the bonding tape 27 on the support faces 31b and 33b.

In FIG. 6C, the nonconductive liquid adhesive 29 is filled between the end faces 15c and 15d of the piezoelectric element 15 and the opposing faces 31a and 33a of the actuator attaching part 17. Although not illustrated, the nonconductive adhesive 29 is also filled between the end faces 15a and 15b of the piezoelectric element 15 and the opposing faces 31a and 33a of the actuator attaching part 17 like FIG. 6C.

Although the nonconductive adhesive 29 has fluidity, the bonding tape 27 bonded to the piezoelectric element 15 and the support faces 31b and 33b stops the flowing of the nonconductive adhesive 29 or prevents the passage or oozing of the nonconductive adhesive 29 caused by the capillary action. As a result, the nonconductive adhesive 29 does not reach the flexure 7 or other parts.

As the nonconductive adhesive 29 is prevented from penetrating or flowing into unintended gaps between the piezoelectric element 15 and any one or more of the actuator plate 13, load beam 5, and flexure 7 during the application and solidification of the adhesive 29, the head suspension 1 is stable and uniform in rigidity, spring load, and dynamic characteristics.

The nonconductive adhesive 29 can be applied as soon as the piezoelectric element 15 is bonded to the actuator attaching part 17 with the bonding tape 27 as illustrated in FIGS. 6B and 6C. Namely, there is no need for setting a wait time that must be set if an adhesive (such as AD1 of FIG. 15B of the related art) is used instead of the bonding tape 27. Accordingly, the first embodiment can reduce the number of time-consuming adhesive applying and solidifying processes to one, to improve productivity.

In FIG. 6D, the nonconductive adhesive 29 solidifies to fix part of the end faces 15c and 15d and the whole of the end faces 15a and 15b (FIG. 2) of the piezoelectric element 15 to the opposing faces 31a and 33a of the actuator attaching part 17.

Figure 7A:
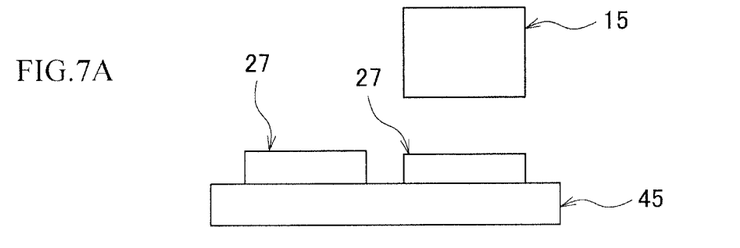
FIG. 7A illustrates a first step that arranges a piezoelectric element in opposition to a bonding tape set on a tape sheet.
Figure 7B:
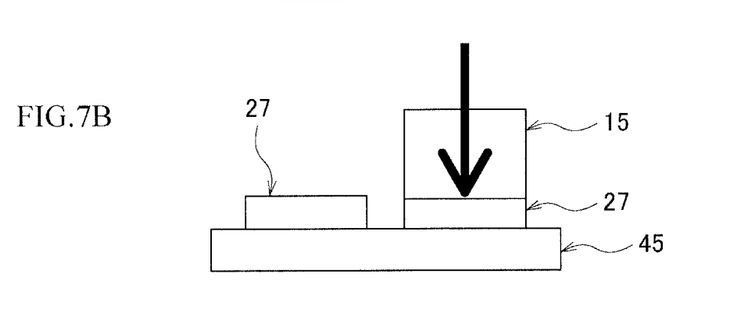
FIG. 7B illustrates a second step that bonds the piezoelectric element to the bonding tape.
Figure 7C:
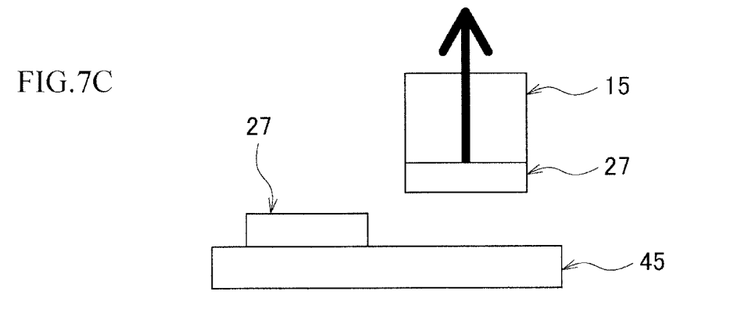
FIG. 7C illustrates a third step that lifts the piezoelectric tape with the bonding tape away from the tape sheet.
Figure 7D:
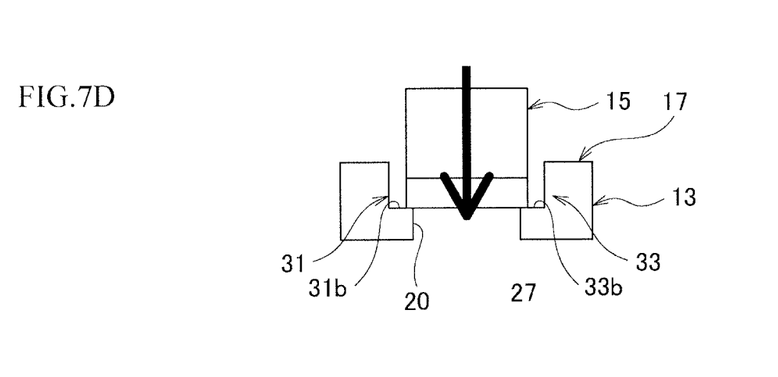
FIG. 7D illustrates a fourth step that bonds the piezoelectric element to the actuator attaching part with the bonding tape.
Figure 8:
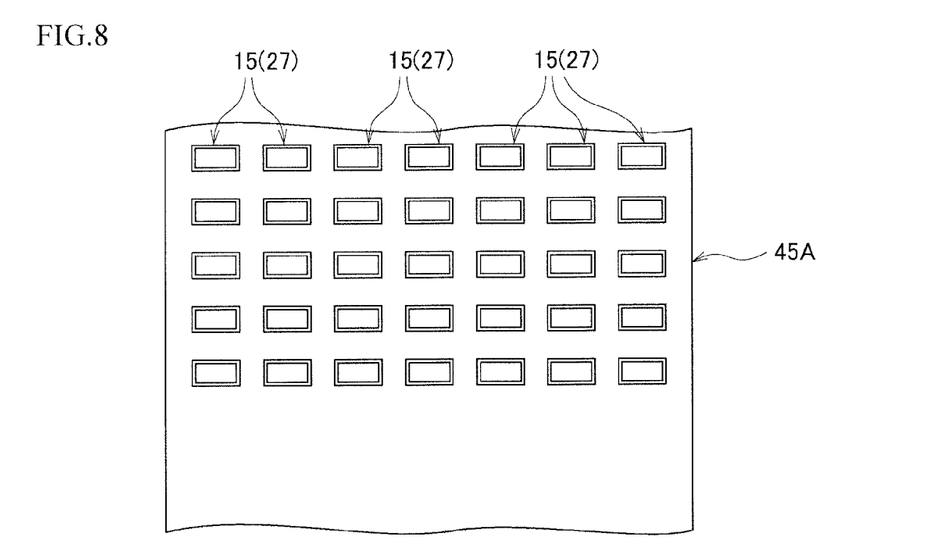
FIG. 8 is a plan view illustrating the piezoelectric elements bonded to bonding tapes of a tape sheet and FIG. 9 is a plan view illustrating chained head suspensions having the actuator attaching parts to which the piezoelectric elements aligned in a line are collectively attached.
Figure 9:
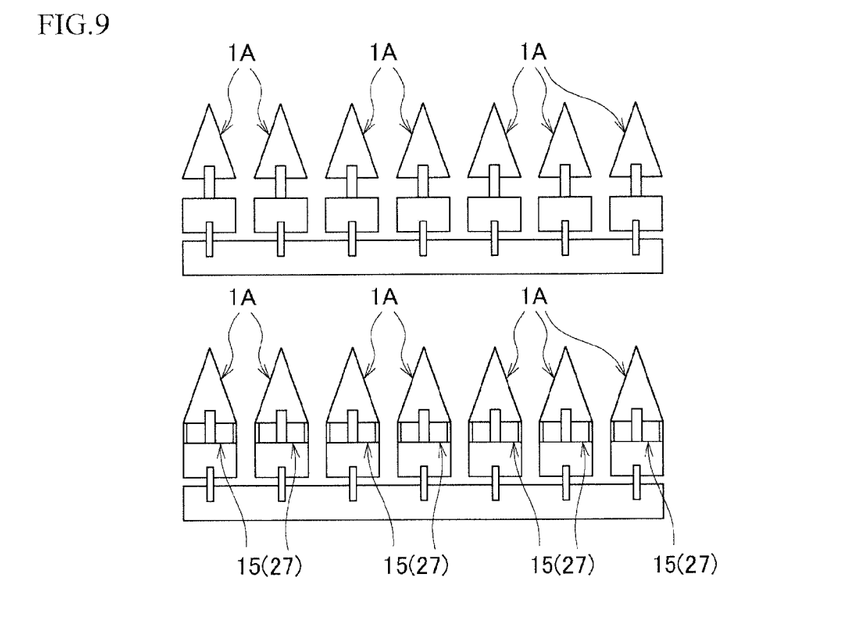

The bonding of the piezoelectric element 15 to the actuator attaching part 17 with the bonding tape 27 is carried out individually as illustrated in FIGS. 7A to 7D or collectively as illustrated in FIGS. 8 and 9.

FIGS. 7A to 7D illustrate the process of individually attaching the piezoelectric element 15 to the actuator attaching part 17

In the bonding process of FIGS. 7A to 7D, the first step of FIG. 7A arranges the piezoelectric element 15 on the bonding tape 27 set on the tape sheet 45 one-on-one. The second step of FIG. 7B lowers the piezoelectric element 15 to bond the piezoelectric element 15 onto the corresponding bonding tape 27. The third step of FIG. 7C lifts the piezoelectric element 15 together with the bonding tape 27 bonded to the lifting piezoelectric element 15 away from the tape sheet 45. The fourth step of FIG. 7D bonds the piezoelectric element 15 to the support faces 31b and 33b with the bonding tape 27. FIG. 7D corresponds to FIG. 6B.

FIGS. 8 and 9 illustrate a process of collectively attaching piezoelectric elements 15 to actuator attaching parts 17. In FIG. 8, piezoelectric elements 15 are bonded to each set of linearly-aligned bonding tapes 27 on a tape sheet 45A, respectively. Although the bonding tape 27 is under the piezoelectric element 15 and is actually invisible in FIG. 8, the bonding tape 27 is illustrated in FIG. 8 (the number "27" in parentheses) together with the piezoelectric element 15 for easy understanding. In FIG. 9, the bonding tapes 27 in the single line are collectively bonded to the actuator attaching parts of chained head suspension 1A. In other words, the piezoelectric elements 15 on the bonding tapes 27 in the single line on the tape sheet 45 are collectively bonded to the actuator attaching parts of chained head suspensions 1A with the bonding tapes 27, respectively. It is possible to individually attach the piezoelectric elements 15 on the tape sheet 45A to the actuator attaching parts of the chained head suspensions 1A.

Effects of the first embodiment of the present invention will be explained.

The head suspension 1 according to the first embodiment includes the base 10 to be attached to a carriage and turned around a spindle of the carriage, the load beam 5 having the rigid part 21 and resilient part (23a, 23b), the resilient part connecting the rigid part 21 to the base 10, the load beam 5 applying load onto the head 26 at a front end distal to the base 10 to write and read information, the flexure 7 attached to the load beam 5, supporting the head 26, and including read/write wiring connected to the head 26, the actuator attaching part 17 arranged between the base 10 and the head 26, to enable the head 26 to be moved in a sway direction relative to the base 10, and the piezoelectric element 15 fixed to the actuator attaching part 17, the piezoelectric element 15 being deformable in response to a voltage applied thereto to move the head 26 in the sway direction relative to the base 10. The piezoelectric element 15 is bonded to the actuator attaching part 17 with the bonding tape 27 and is fixed to the same with the nonconductive adhesive 29.

This configuration reduces the number of time-consuming adhesive applying and hardening steps to one and surely positions the piezoelectric element 15 in the actuator attaching part 17, to thereby improve productivity.

The bonding tape 27 restricts the flowing of the nonconductive adhesive 29 before it hardens, thereby preventing the adhesive 29 from oozing into unintended gaps between the piezoelectric element 15 and the actuator plate 13, load beam 5, and flexure 7 due to the capillary action.

Accordingly, the piezoelectric element 15 is correctly bonded and fixed to the actuator attaching part 17 of the head suspension 1. It, therefore, suppresses variation in rigidity, spring load, and dynamic characteristics of the head suspension 1. In other words, the head suspension 1 is stable and uniform in rigidity, spring load, and dynamic characteristics, to correctly support and drive the head 26.

In particular, the actuator attaching part 17 has the through opening 20 formed through the actuator attaching part 17 in the thickness direction and located between the base 10 and the head 26 in the front-rear direction. The actuator supports 31 and 33 each having a recessed shape are formed on both sides of the through opening 20 in the front-rear direction, respectively. The actuator supports 31 and 33 include the opposing faces 31a and 33a that extending along the thickness direction and support faces 31b and 33b intersecting or orthogonal to the thickness direction. Edges of the common electrode plate 35 of the piezoelectric element 15 are bonded to the respective support faces 31b and 33b of the actuator attaching part 17 with the bonding tape 27. The whole of the end faces 15a and 15b and part of the end faces 15c and 15d of the piezoelectric element 15 are fixed to the opposing faces 31a and 33a of the actuator attaching part 17 with the nonconductive adhesive 29.

The piezoelectric element 15 is bonded to the support faces 31b and 33b with the bonding tape 27 and is fixed to the opposing faces 31a and 33a with the nonconductive adhesive 29, thereby to result in correctly attaching the piezoelectric element 15 to the recessed actuator supports 31 and 33 and improve productivity.

The piezoelectric element attaching method for the head suspension 1 according to the first embodiment bonds the piezoelectric element 15 to the actuator attaching part 17 with the bonding tape 27 and then fixes the piezoelectric element 15 and the actuator attaching part 17 together with the nonconductive adhesive 29.

The method reduces the number of time-consuming adhesive applying and hardening steps to one, i.e., needs only the applying and hardening step for the nonconductive adhesive 29 and surely positions the piezoelectric element 15 in the actuator attaching part 17 by bonding with the bonding tape 27, thereby improving productivity. The piezoelectric element 15 is bonded to the actuator attaching part 17 with the bonding tape 27 prior to fixing with the nonconductive adhesive 29, so that it restricts the flowing of the nonconductive adhesive 29 before it hardens. This prevents the adhesive 29 from oozing into unintended gaps due to the capillary action. The head suspension 1 thus produced is stable and uniform in rigidity, spring load, and dynamic characteristics.

The method attaches the common electrode plate 35 of the piezoelectric element 15 to the bonding tape 27 on the tape sheet 45, removes the piezoelectric element 15 together with the bonding tape 27 from the tape sheet 45, and bonds the piezoelectric element 15 to the actuator attaching part 17 with the bonding tape 27. This technique avoids the bonding tape 27 itself from being solely handled and easily bonds the piezoelectric element 15 having the bonding tape 27 to the actuator attaching part 17.

The actuator 9 according to the first embodiment includes the actuator attaching part 17 located between the base 10 and the head 26 movably supporting the head 26 relative to the base 10. The actuator 9 also includes the piezoelectric element 15 attached to the actuator attaching part 17, the piezoelectric element 15 being deformable in response to a voltage applied thereto to move the head 26 relative to the base 10.

The piezoelectric element 15 is bonded to the actuator attaching part 17 with the bonding tape 27 and is fixed to the same with the nonconductive adhesive 29.

This configuration reduces the number of time-consuming adhesive applying and hardening steps to one and surely positions the piezoelectric element 15 in the actuator attaching part 17. In addition, it prevents the adhesive 29 from penetrating into gaps around the piezoelectric element 15 and correctly bonds and fixes the piezoelectric element 15 to the actuator attaching part 17 of the actuator 9.

The piezoelectric element attaching method for the actuator 9 according to the first embodiment bonds the piezoelectric element 15 to the actuator attaching part 17 with the bonding tape 27 and then applies the nonconductive adhesive 29 to fix the piezoelectric element 15 to the actuator attaching part 17.

The method reduces the number of time-consuming adhesive applying and hardening steps to one and surely positions the piezoelectric element 15 in the actuator attaching part 17 of the actuator 9 to improve productivity. The piezoelectric element 15 is bonded to the actuator attaching part 17 with the bonding tape 27 prior to fixing with the nonconductive adhesive 29, so that it restricts the flowing of the nonconductive adhesive 29. The actuator 9 thus produced is, therefore, stable and uniform in rigidity and other characteristics.

Head suspensions, actuators, and methods of attaching a piezoelectric element according to the second to fifth embodiments of the present invention will be explained with reference to FIGS. 10A to 14D. These embodiments are based on the first embodiment, and therefore, FIGS. 10A to 14D illustrate only characteristic parts of the embodiments (in particular, the actuator attaching part and piezoelectric element of a head suspension or of an actuator of each embodiment). For the other parts of the second to fifth embodiments not illustrated in FIGS. 10A to 14D, FIGS. 1 to 4 commonly serve.

The second embodiment will be explained with reference to FIGS. 10A to 10C. The second embodiment is based on the first embodiment, and therefore, like parts are represented with like reference numerals or like reference numerals plus "B" to omit overlapping explanation.

Figures 10A, 10B:
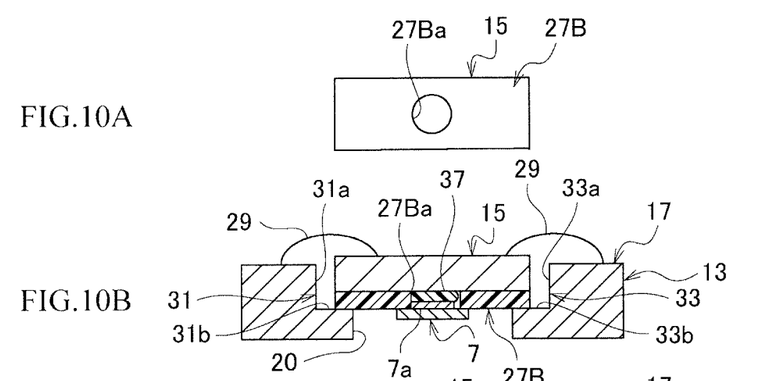
FIG. 10A is a back view of a piezoelectric element with a bonding tape.
FIG. 10B is a sectional view illustrating a condition that the piezoelectric element is bonded to an actuator attaching part with the bonding tape, a contact of a flexure is bonded to the piezoelectric element, and an adhesive is filled between the piezoelectric element and the actuator attaching part.
Figure 10C:
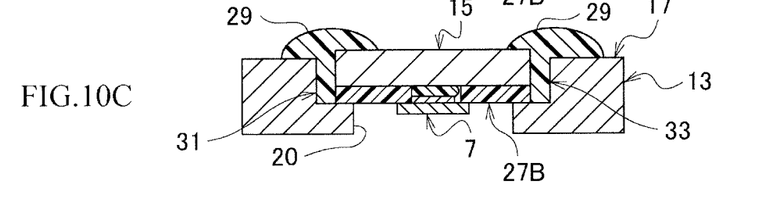
FIG. 10C is a sectional view illustrating a condition that the piezoelectric element is fixed to the actuator attaching part with the adhesive.

FIG. 10A is a back view of the piezoelectric element 15 with a bonding tape 27B. FIG. 10B is a sectional view illustrating a condition that the piezoelectric element 15 is bonded to the actuator attaching part 17 with the bonding tape 27B, the flexure contact 7a is bonded to the piezoelectric element 15, and an adhesive 29 is filled between the piezoelectric element 15 and the actuator attaching part 17, and FIG. 10C is a sectional view illustrating a condition that the piezoelectric element 15 is fixed to the actuator attaching part 17 with the adhesive 29.

According to the second embodiment, the bonding tape 27B has a central contact hole 27Ba to define and expose a contact on the piezoelectric element 15 and is bonded to the common electrode plate 35 of the piezoelectric element 15.

Attaching the piezoelectric element 15 to the actuator attaching part 17 is carried out in an order similar to FIGS. 6A to 6D. FIG. 10B corresponds to FIG. 6C and FIG. 10C to FIG. 6D. According to the second embodiment, the contact 7a of the flexure 7 is set in the through opening 20 and is bonded through the hole 27Ba of the bonding tape 27B to a central portion of the common electrode plate 35 of the piezoelectric element 15 with the conductive paste 37.

As a result, the conductive paste 37 on the flexure contact 7a is surrounded by an inner periphery of the hole 27Ba to prevent the conductive paste 37 from spreading or oozing out. If the bonding tape 27B is one that does not harden after the nonconductive adhesive 29 hardens, it will relax stress on the conductive paste 37 on the flexure contact 7a.

Otherwise, the second embodiment provides effects similar to those of the first embodiment.

A modification of the second embodiment will be explained with reference to FIGS. 11A to 11C. The modification is based on the first and second embodiments, and therefore, like parts are represented with like reference numerals or like reference numerals plus "C" to omit overlapping explanation.

Figure 11A:
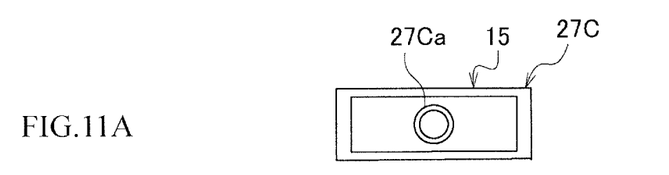
FIG. 11A is a back view of a piezoelectric element with a bonding tape.
Figure 11B:
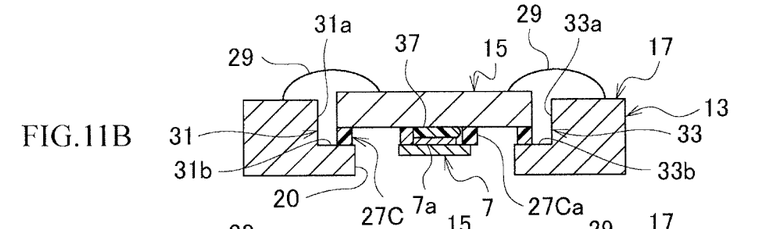
FIG. 11B is a sectional view illustrating a condition that the piezoelectric element is bonded to an actuator attaching part with the bonding tape, a contact of a flexure is bonded to the piezoelectric element, and an adhesive is filled between the piezoelectric element and the actuator attaching part.
Figure 11C:
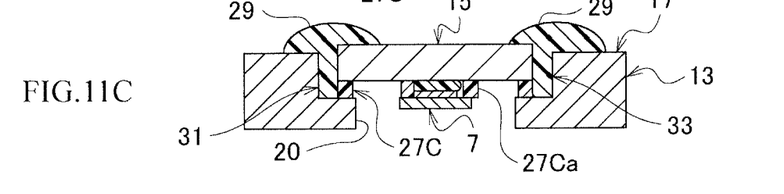
FIG. 11C is a sectional view illustrating a condition that the piezoelectric element is fixed to the actuator attaching part with the adhesive.

FIG. 11A is a back view of the piezoelectric element 15 with a bonding tape 27C, FIG. 11B is a sectional view illustrating a condition that the piezoelectric element 15 is bonded to the actuator attaching part 17 with the bonding tape 27C, the flexure contact 7a is bonded to the piezoelectric element 15, and the adhesive 29 is filled between the piezoelectric element 15 and the actuator attaching part 17, and FIG. 11C is a sectional view illustrating a condition that the piezoelectric element 15 is fixed to the actuator attaching part 17 with the adhesive 29.

According to the modification, the bonding tape 27C has a ring 27Ca (FIG. 11A) instead of the hole 27Ba (FIG. 10A) of the second embodiment. The bonding tape 27C is basically the same as the bonding tape 27 of the first embodiment except that the bonding tape 27C has the central ring 27Ca.

The ring 27Ca is already formed in the bonding tape 27C when the bonding tape 27C is on the tape sheet 45 of FIG. 7A (45A of FIG. 8). When the piezoelectric element 15 is bonded to the bonding tape 27C on the tape sheet, the ring 27Ca is also bonded to the piezoelectric element 15.

Attaching the piezoelectric element 15 to the actuator attaching part 17 is carried out in an order similar to FIGS. 6A to 6D. FIG. 11B corresponds to FIG. 6C and FIG. 11C to FIG. 6D.

The modification surrounds the conductive paste 37 on the flexure contact 7a by the ring 27Ca to prevent the conductive paste 37 from spreading or oozing out. In addition, the modification prevents the bonding tape 27C from being excessively exposed. If the bonding tape 27C is one that does not harden after the nonconductive adhesive 29 hardens, it will relax stress on the conductive paste 37 on the flexure contact 7a.

The third embodiment will be explained with reference to FIGS. 12A to 12C. The third embodiment is based on the first embodiment, and therefore, like parts are represented with like reference numerals or like reference numerals plus "D" to omit overlapping explanation.

Figure 12A:
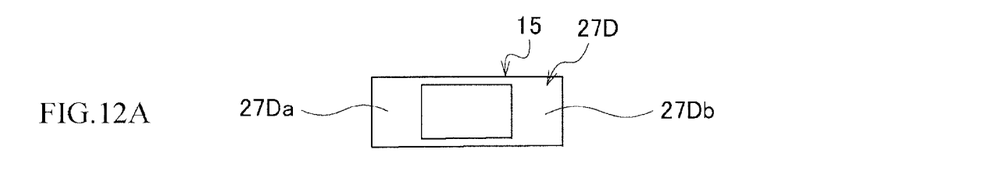
FIG. 12A is a back view of a piezoelectric element with a bonding tape.
Figure 12B:
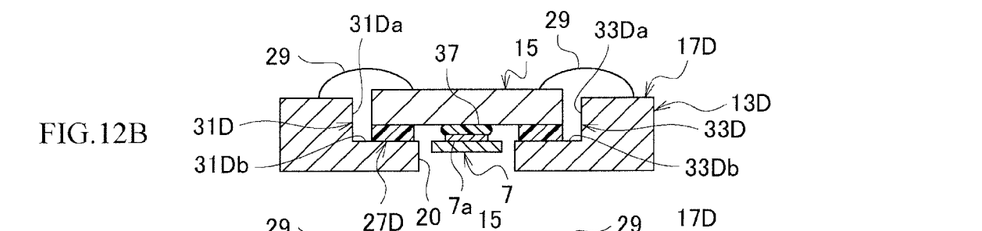
FIG. 12B is a sectional view illustrating a condition that the piezoelectric element is bonded to an actuator attaching part with the bonding tape, a contact of a flexure is bonded to the piezoelectric element, and an adhesive is filled between the piezoelectric element and the actuator attaching part.
Figure 12C:
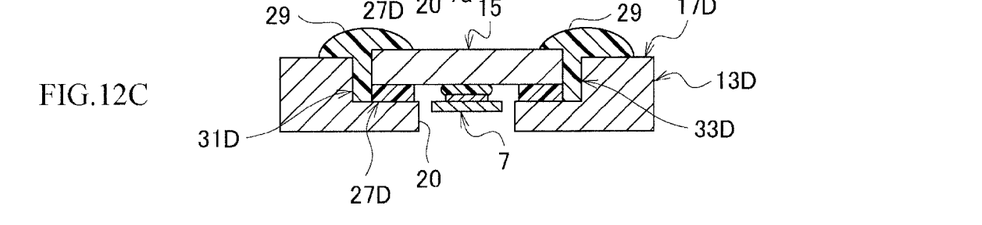
FIG. 12C is a sectional view illustrating a condition that the piezoelectric element is fixed to the actuator attaching part with the adhesive.

FIG. 12A is a back view of the piezoelectric element 15 with a bonding tape 27D, FIG. 12B is a sectional view illustrating the piezoelectric element 15 bonded to an actuator attaching part 17D with the bonding tape 27D, the flexure contact 7a bonded to the piezoelectric element 15, and the adhesive 29 filled between the piezoelectric element 15 and the actuator attaching part 17D, and FIG. 12C is a sectional view illustrating the piezoelectric element 15 fixed to the actuator attaching part 17D with the adhesive 29.

According to the third embodiment, the bonding tape 27D has widthwise side portions 27Da and 27Db that are wider than those of the first embodiment. Support faces 31Db and 33Db of the actuator attaching part 17D in an actuator plate 13D are accordingly wider than those of the first embodiment. The bonding tape 27D is viscoelastic and has viscoelasticity even after the nonconductive adhesive 29 hardens.

Attaching the piezoelectric element 15 to the actuator attaching part 17D is carried out in an order similar to FIGS. 6A to 6D. FIG. 12B corresponds to FIG. 6C and FIG. 12C to FIG. 6D.

According to the third embodiment, the bonding tape 27D having the wider side portions 27Da and 27Db than the first embodiment bonds the piezoelectric element 15 to the wider support faces 31Db and 33Db, to surely suppress vibration of the support faces 31Db and 33Db without hindering a stroke of the piezoelectric element 15.

Any one of the first, second, and fourth (explained below) embodiments may employ a viscoelastic bonding tape. In the second embodiment of FIGS. 10A to 10C, the bonding tape 27B may have viscoelasticity like the bonding tape 27D of FIG. 12A and the support faces 31b and 33b may be widened. In the modification of FIGS. 11A to 11C, the bonding tape 27C may have viscoelasticity like the bonding tape 27D of FIG. 12A and the side portions of the bonding tape 27C and the support faces 31b and 33b may be widened. With the viscoelastic bonding tapes, the examples of FIGS. 10A to 10C and 11A to 11C are able to suppress vibrations of the flexures 7.

The fourth embodiment of the present invention will be explained with reference to FIGS. 13A and 13B. The fourth embodiment is based on the first embodiment, and therefore, like parts are represented with like reference numerals or like reference numerals plus "E" to omit overlapping explanation.

Figure 13A:
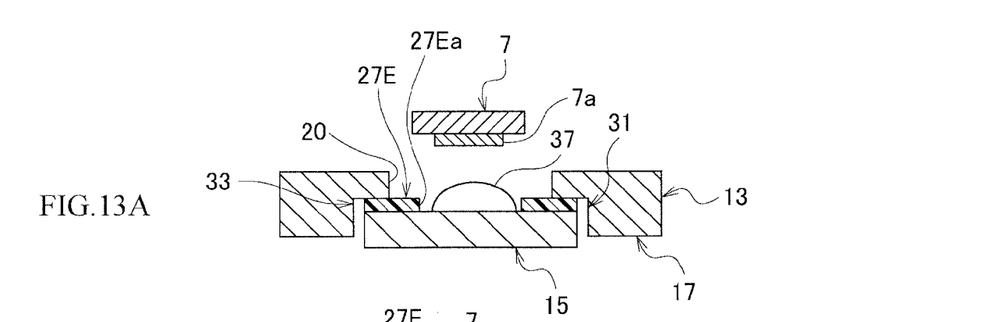
FIG. 13A illustrates a condition that a piezoelectric element is bonded to an actuator attaching part with a bonding tape and inverted and a contact of a flexure is faced to the piezoelectric element and FIG. 13B illustrates a condition that the contact of the flexure is bonded to the piezoelectric element.
Figure 13B:
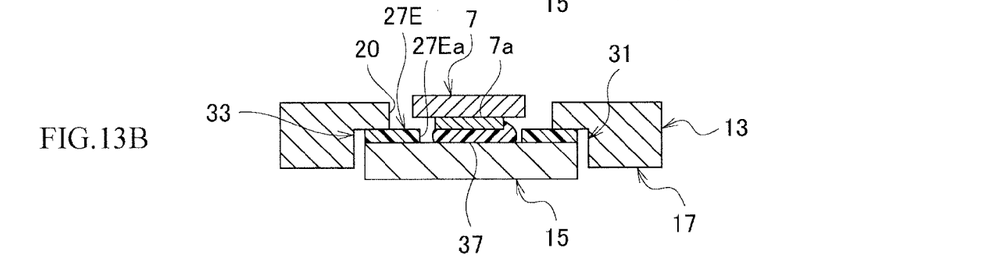

FIG. 13A illustrates a condition that the piezoelectric element 15 is bonded to the actuator attaching part 17 with a bonding tape 27E and inverted and the flexure contact 7a is faced to the piezoelectric element 15 and FIG. 13B is a sectional view illustrating a condition that the flexure contact 7a is bonded to the piezoelectric element 15.

According to the fourth embodiment, the piezoelectric element 15 is bonded to the support faces 31b and 33b of the actuator supports 31 and 33 of the actuator attaching part 17 with the bonding tape 27E like FIG. 6B. At this time, the contact 7a of the flexure 7 is not yet bonded to the piezoelectric element 15 in this example. The actuator attaching part 17 with the piezoelectric element 15 is inverted as illustrated in FIG. 13A.

The bonding tape 27E has a central contact hole 27Ea like that of FIG. 10A.

Conductive paste 37 is applied to a central part of the common electrode plate 35 of the piezoelectric element 15 and the contact 7a of the flexure 7 is set on the conductive paste 37 and is bonded to the common electrode plate 35 with the conductive paste 37 as illustrated in FIG. 13B. At this time, the conductive paste 37 on the flexure contact 7a is surrounded by the inner periphery of the hole 27Ea, and therefore, does not ooze out.

In this way, the fourth embodiment bonds the piezoelectric element 15 to the actuator attaching part 17 with the bonding tape 27E, and just after that, allows the actuator attaching part 17 and piezoelectric element 15 to be inverted. Thereafter, the fourth embodiment electrically connects the flexure contact 7a to the common electrode plate 35 of the piezoelectric element 15 so that the flexure 7 is put on the piezoelectric element 15.

The technique of the fourth embodiment is applicable to the second and third embodiments of FIGS. 10A to 12C.

The fifth embodiment of the present invention will be explained with reference to FIGS. 14A to 14D. The fifth embodiment is based on the first embodiment, and therefore, like parts are represented with like reference numerals or like reference numerals plus "F" to omit overlapping explanation.

Figure 14A:
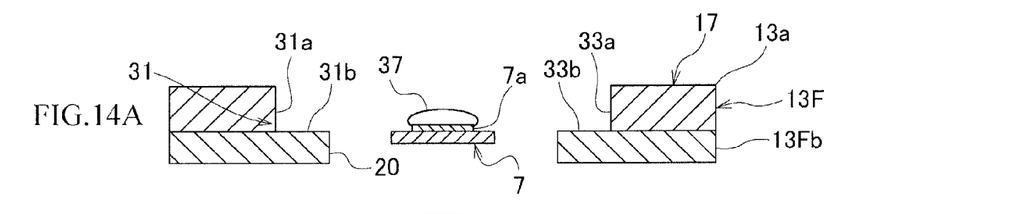
FIG. 14A illustrates an actuator attaching part and a contact of a flexure.
Figure 14B:
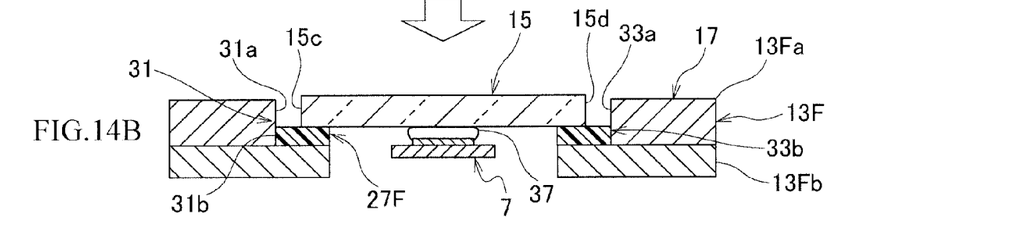
FIG. 14B illustrates a condition that a piezoelectric element is bonded to the actuator attaching part with a bonding tape.
Figure 14C:
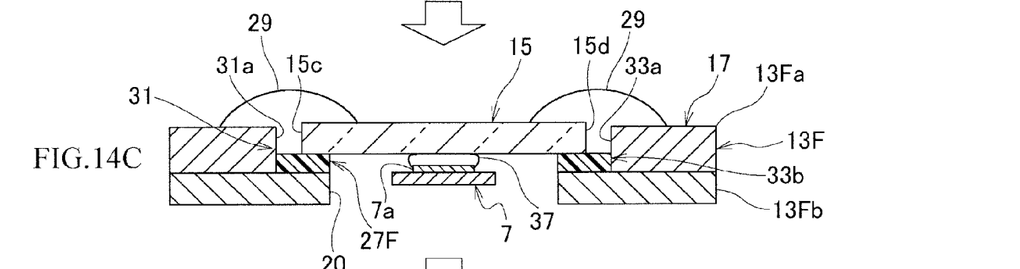
FIG. 14C illustrates a condition that an adhesive is filled between the piezoelectric element and the actuator attaching part.
Figure 14D:
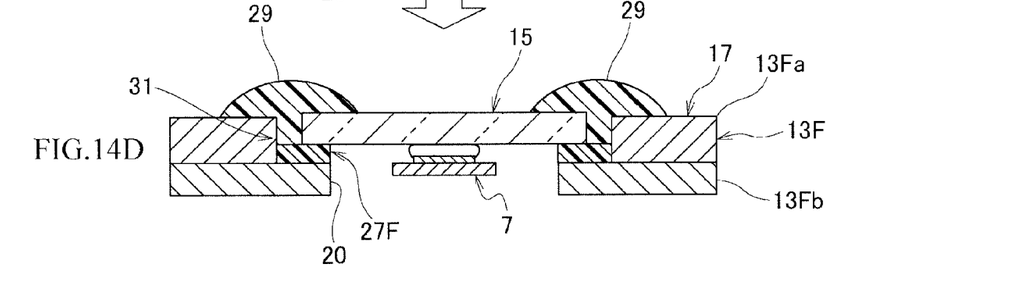
FIG. 14D illustrates a condition that the piezoelectric element is fixed to the actuator attaching part with the adhesive.

FIG. 14A illustrates the actuator attaching part 17 and flexure contact 7a, FIG. 14B illustrates a condition that the piezoelectric element 15 is bonded to the actuator attaching part 17 with a bonding tape 27F, FIG. 14C illustrates a condition that the adhesive 29 is filled between the piezoelectric element 15 and the actuator attaching part 17, and FIG. 14D illustrates a condition that the piezoelectric element 15 is fixed to the actuator attaching part 17 with the adhesive 29.

According to the fifth embodiment, an actuator plate 13F that defines the actuator attaching part 17 is made of a first plate 13Fa having opposing faces 31a and 33a and a second plate 13Fb having support faces 31b and 33b. The first and second plates 13Fa and 13Fb are laid one on another and joined together.

The bonding tape 27F has an outline of an outer circumferential edge that is larger than an outline of an outer circumferential edge of the piezoelectric element 15 and is equal to an inner circumferential edge of the actuator attaching part 17. As a result, the edge of the bonding tape 27F protrudes out of the edge of the piezoelectric element 15.

Attaching the piezoelectric element 15 to the actuator attaching part 17 is carried out like FIGS. 6A to 6D. Namely, FIGS. 14A to 14D correspond to FIGS. 6A to 6D, respectively.

According to the fifth embodiment, the edge of the bonding tape 27F closes a joint line between the first and second plates 13Fa and 13Fb, to prevent the nonconductive adhesive 29 tilled as illustrated in FIG. 14C from penetrating into a gap between the first and second plates 13Fa and 13Fb due to the capillary action.

To surely fit the edge of the bonding tape 27F to the support faces 31b and 33b in FIG. 14B, air may be blown to the edge of the bonding tape 27F protruding from the piezoelectric element 15. This surely closes the joint line between the first and second plates 13Fa and 13Fb with the bonding tape 27F.

If there is no adhesive on an upper surface of the edge of the bonding tape 27F protruding from the piezoelectric element 15 in FIG. 14B, a jig may be used to press the edge of the bonding tape 27F from the above in the step of FIG. 14B so that the joint line between the first and second plates 13Fa and 13Fb is surely closed with the bonding tape 27F.

The edge of the bonding tape 27F protruding from the piezoelectric element 15 is satisfactory if it can close the joint line between the first and second plates 13Fa and 13Fb. It is possible to form the protruding edge of the bonding tape 27F only on the front and rear sides of the piezoelectric element 15 or only on the left and right sides thereof.

The bonding tape 27F may be attached in advance to the support faces 31b and 33b to close the joint line between the first and second plates 13Fa and 13Fb, and thereafter, the piezoelectric element 15 may be bonded onto the bonding tape 27F on the support faces 31b and 33b.

The fifth embodiment is applicable to any one of the second to fourth embodiments of FIGS. 10A to 13B.

According to the embodiments mentioned above, the base plate 3 and actuator plate 13 are made from discrete plate materials. Instead, they may integrally be made from a single plate material.

According to the embodiments, the actuator 9 includes only one piezoelectric element 15. Instead, the actuator 9 may include a pair of piezoelectric elements arranged side by side.

The actuator 9 of the present invention is applicable not only to a head suspension but also to other devices.

What is claimed is:
1. A head suspension comprising:
a base to be attached to a carriage and turned around a spindle of the carriage;
a load beam having a rigid part and a resilient part, the resilient part connecting the rigid part to the base, the load beam applying load onto a head at a front end distal to the base to write and read information;

a flexure attached to the load beam and supporting the head to connect the head to read/write wiring;

an actuator attaching part located between the base and the head, to enable the head to be moved in a sway direction relative to the base;

a piezoelectric element fixed to the actuator attaching part and being deformable in response to a voltage applied thereto to move the head in the sway direction relative to the base;

a bonding tape bonding the piezoelectric element to the actuator attaching part; and an adhesive fixing the bonded piezoelectric element to the actuator attaching part.

2. The head suspension of claim 1, wherein the bonding tape is annularly formed along a peripheral edge of the piezoelectric element.

3. The head suspension of claim 1, wherein the bonding tape is viscoelastic after the adhesive solidifies.

4. The head suspension of claim 1, wherein the actuator attaching part has a through opening formed through the actuator attaching part in a thickness direction thereof and actuator supports formed on both sides of the opening, respectively, each of the actuator supports having a recessed shape defined with an upright face extending along the thickness direction and a support face intersecting the thickness direction, wherein the bonding tape bonds edges of an electrode surface of the piezoelectric element to the respective support faces of the actuator supports, and wherein the adhesive fixes end faces of the piezoelectric element to the respective upright faces of the actuator supports.

5. The head suspension of claim 4, wherein the bonding tape has a center contact hole and is bonded to the electrode surface of the piezoelectric element, and wherein a contact of the flexure is positioned in the opening of the actuator attaching part and is bonded with a conductive adhesive to the electrode surface of the piezoelectric element through the contact hole.

6. The head suspension of claim 4, wherein the bonding tape has a center ring and is bonded to the electrode surface of the piezoelectric element, and wherein a contact of the flexure is positioned in the through opening and is bonded with a conductive adhesive to the electrode surface of the piezoelectric element through the ring.

7. The head suspension of claim 4, wherein the upright face and support face of each actuator support are formed of discrete first and second plates joined together, respectively, and wherein an edge of the bonding tape protrudes from the edge of the piezoelectric element to close a joint line between the first and second plates.

8. An actuator comprising:

an actuator attaching part located between a base and a movable part and movably supporting the movable part relative to the base;

a piezoelectric element attached to the actuator attaching part, the piezoelectric element being deformable in response to a voltage applied thereto to move the movable part relative to the base; and a bonding tape bonding the piezoelectric element to the actuator attaching part; and an adhesive fixing the bonded piezoelectric element to the actuator attaching part.

9. The actuator of claim 8, wherein the bonding tape is annularly formed along a peripheral edge of the piezoelectric element.

10. The actuator of claim 8, wherein the bonding tape is viscoelastic after the adhesive solidifies.

* * * * *